(12) United States Patent
Scardino et al.

(10) Patent No.: US 6,537,355 B2
(45) Date of Patent: Mar. 25, 2003

(54) EVAPORATIVE EMISSION TREATMENT DEVICE

(75) Inventors: Eileen A. Scardino, Rochester, NY (US); Jonathan M. Oemcke, Rochester, NY (US); Marshall Ferguson, Penfield, NY (US); Peter Alfred, Victor, NY (US); Martin Martina, Penfield, NY (US); Gregory Weilnau, Churchville, NY (US)

(73) Assignee: Delphi Technologies, Inc., Troy, MI (US)

( * ) Notice: Subject to any disclaimer, the term of this patent is extended or adjusted under 35 U.S.C. 154(b) by 37 days.

(21) Appl. No.: 09/749,294

(22) Filed: Dec. 27, 2000

(65) Prior Publication Data

US 2002/0078829 A1 Jun. 27, 2002

(51) Int. Cl.[7] .......................... B01D 53/04; F02M 37/04
(52) U.S. Cl. .......................... 96/147; 55/502; 123/519
(58) Field of Search .................... 123/519; 96/147, 96/151; 55/385.3, 501, 502, 503, DIG. 19

(56) References Cited

U.S. PATENT DOCUMENTS

| | | | |
|---|---|---|---|
| 3,854,888 A | * 12/1974 | Frietzsche et al. | |
| 4,322,230 A | * 3/1982 | Schoen et al. | |
| 4,381,929 A | * 5/1983 | Mizuno et al. | |
| 4,386,947 A | * 6/1983 | Mizuno et al. | |
| 4,416,675 A | * 11/1983 | Montierth | 55/502 |
| 4,419,108 A | * 12/1983 | Frost et al. | 55/502 |
| 4,504,294 A | * 3/1985 | Brighton | 422/179 |
| 5,008,086 A | * 4/1991 | Merry | 422/179 |
| 5,385,873 A | * 1/1995 | MacNeill | |
| 5,685,985 A | * 11/1997 | Brown et al. | 210/450 |
| 5,910,637 A | 6/1999 | Meiller et al. | 96/135 |
| 5,914,294 A | 6/1999 | Park et al. | 502/417 |
| 5,924,410 A | 7/1999 | Dumas et al. | 123/519 |
| 5,957,114 A | 9/1999 | Johnson et al. | 123/519 |
| 6,041,761 A | 3/2000 | Uto et al. | 123/520 |
| 6,190,432 B1 | * 2/2002 | Gieseke et al. | 55/498 |
| 6,447,567 B1 | * 9/2002 | Ehrenberg | 55/498 |

FOREIGN PATENT DOCUMENTS

JP 10037812 2/1998

OTHER PUBLICATIONS

U.S. patent application Ser. No. 09/999,554, Scardino et al., filed Nov. 30, 2001.

\* cited by examiner

*Primary Examiner*—David A. Simmons
*Assistant Examiner*—Frank M. Lawrence
(74) *Attorney, Agent, or Firm*—Vincent A. Cichosz

(57) ABSTRACT

The evaporative emission treatment device comprises a monolith concentrically disposed within a shell, and having one or more sealing agents concentrically disposed about the monolith and in between the monolith and housing. The shell comprises a first shell portion having an inlet portion at one end and a connection element disposed at the opposing end, and a second shell portion having an outlet portion at one end and a connection element disposed at the opposing end. The shell can also include structural features to prevent fluid leakage, enhance fluid flow, enable attachment to other evaporative emission system components, enable mounting to a vehicle, and internally seal the monolith and sealing agents.

25 Claims, 5 Drawing Sheets

EVAPORATIVE EMISSION TREATMENT DEVICE

TECHNICAL FIELD

This disclosure relates to evaporative emission treatment systems, and, more particularly, to an evaporative emission treatment device.

BACKGROUND

Evaporative emission treatment systems typically comprise a fuel tank, internal combustion engine, intake manifold assembly, carbon canister, and various lines and vents to treat evaporative emissions. The evaporative emissions typically contain evaporated fuel, or hydrocarbon vapors, that "bleed" from the aforementioned components during and after operating a motor vehicle. The carbon canisters trap the majority of hydrocarbon vapor that escapes from these components. However, carbon canisters do not completely prevent hydrocarbon vapor from being released into the atmosphere. As a result, conventional carbon canisters and evaporative emission treatment systems do not meet stringent emission regulations.

Consequently, there exists a need for an evaporative emission treatment device that prevents hydrocarbon vapor leakage into the atmosphere.

SUMMARY

The drawbacks and disadvantages of the prior art are overcome by the evaporative emission treatment device, and its method of manufacture, described herein. The evaporative emission treatment device comprises a monolith concentrically disposed in a shell. In addition, a sealing agent is concentrically disposed about the monolith, and in between the shell and monolith. The method for manufacturing an evaporative emission treatment device comprises disposing a sealing agent about a monolith to form a monolith/sealing agent subassembly. The monolith/sealing agent subassembly is concentrically disposed in a first half shell. The first half shell is connected and secured to a second half shell.

BRIEF DESCRIPTION OF THE DRAWINGS

Referring now to the Figures, which are meant to be exemplary, and not limiting, and wherein like elements are numbered alike in the figures.

DESCRIPTION OF THE PREFERRED EMBODIMENT

The evaporative emission treatment device comprises a monolith concentrically disposed within a shell, and having one or more sealing agents concentrically disposed about the monolith and in between the monolith and housing. The shell comprises a first half shell having an inlet portion at one end and a connection element disposed at the opposing end, and a second half shell having an outlet portion at one end and a connection element disposed at the opposing end. The shell can also include structural features to prevent fluid leakage, enhance fluid flow, enable attachment to other evaporative emission system components, enable mounting to a vehicle, and internally seal the monolith and sealing agents.

The evaporative emission treatment device further comprises concentrically disposing one or more sealing agents about a monolith. The monolith/sealing agent subassembly can be concentrically disposed within a first end of a first half shell. The first half shell further comprises a second end having a connection element that can be attached to a connection element of a second half shell. The first half shell containing the monolith/sealing agent subassembly can be secured together to form an evaporative emissions treatment device assembly. One or more mounting members can be affixed thereto to form an evaporative emissions treatment device assembly to facilitate the desired attachment.

The evaporative emission treatment device can comprise a carbon canister, hydrocarbon-scrubbing device, and the like, and preferably a hydrocarbon-scrubbing device. The hydrocarbon-scrubbing device can include a monolith, also referred to as a brick, substrate, or support. The monolith preferably comprises an activated carbon element such as that described in U.S. Pat. No. 5,914,294 to Park et al. which is incorporated by referenced herein.

The monolith can be supported within the housing using one or more sealing agents concentrically disposed about it, wherein the sealing agents are preferably flexible. The sealing agents can comprise a variety of materials such as elastomeric materials, polymeric materials, foam, plastic (e.g., thermoplastic materials, and the like), composite materials, and the like. For example, the sealing agent preferably disposed near the inlet and outlet of the shell comprises sponge rubber sealing material such as nitrile sponge; fluorocarbon rubber sponge referred to as "VITON®" (commercially available from Lauren Manufacturing Company, New Philadelphia, Ohio); epichlorohydrin rubber sponge; and combinations comprising at least one of the foregoing sponge rubber sealing materials, and the like, with VITON® preferred.

Figure 1:
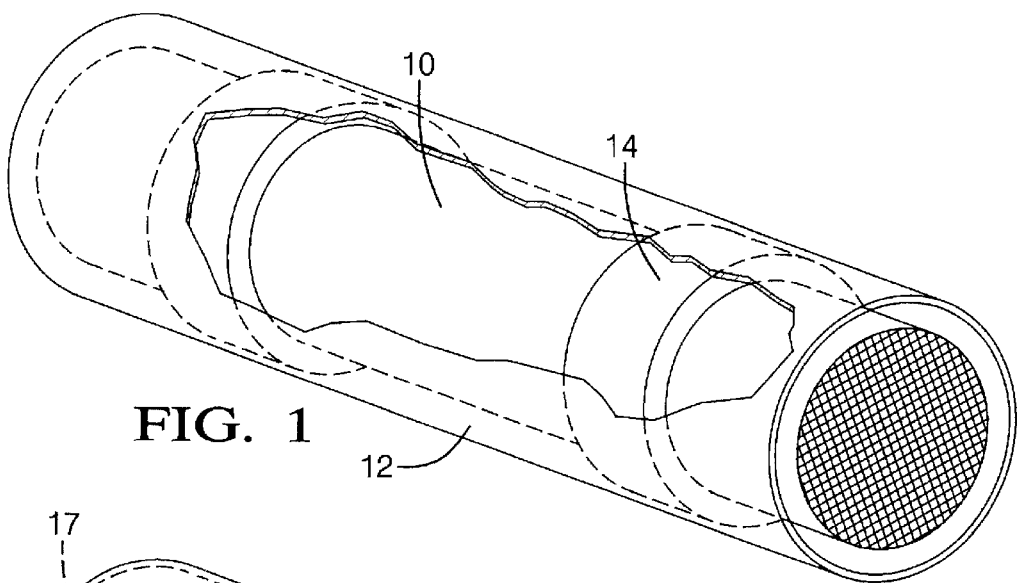
FIG. 1 is an isometric, partial cut-away view of an embodiment of the evaporative emission treatment device.

The sealing agents can further comprise one or more sleeve like portions comprising a sponge rubber sealing material, and preferably comprises two sleeves of sponge rubber sealing material concentrically disposed about the monolith at either, or between, the inlet portion and outlet portion of the monolith as illustrated in FIG. 1. This sealing agent forces the fluids to flow into the monolith, preventing them from flowing around the monolith. The sealing agent can be extruded, for example, to the desired length for the particular application and cut to form the sleeve or plurality of sleeves. The sealing agent eliminates the need for conventional adhesives that can ultimately emit hydrocarbons into the atmosphere.

In an alternative embodiment, the sealing agent can comprise one or more molded elastomeric seals comprising a conventional moldable elastomer material alone or in conjunction with the above sealing agents. The molded elastomeric seals can preferably comprise an annular seal having an annular shoulder portion that can be concentrically disposed about and engage either the inlet or outlet of the monolith, and preferably disposed about and engaging both the inlet and the outlet of the monolith to form a monolith/sealing agent subassembly.

The monolith/sealing agent subassembly can be concentrically disposed within a first half shell, which can be connected to a second half shell to form the evaporative emission treatment device assembly (See FIGS. 1–4). The shells can comprise a non-ferrous or ferrous material capable of operating in an evaporative emissions environment having the following characteristics: (1) capable of operating at temperatures up to about 125° C.; and (2) capable of withstanding exposure to hydrocarbons, carbon dioxide, and/or water. Possible non-ferrous materials can include plastics, composite materials, and combinations comprising at least foregoing non-ferrous materials, and the like. Possible ferrous materials can include carbon steels, alloys, and combinations comprising at least one of the foregoing ferrous materials.

The first half shell can comprise an inlet portion at one end and a connection element disposed at the opposing end. In contrast, the second half shell can comprise an outlet portion at one end and a connection element disposed at the opposing end. Possible connection elements for either the first half shell and/or second half shell can include a spin-weld, twist-lock, snap-fit, and combinations comprising at least one of the foregoing connection elements (See FIGS. 3–6). A spin weld connection can include any type of weld that can preferably sealingly secure the first half shell to the second half shell (See FIG. 3). Possible types of welds can include a TIG weld (Tungsten Inert Gas), MIG weld, spot weld, seam weld, and combinations comprising at least one of the foregoing welds. When employing the spin-weld connection, the second half shell can preferably comprise an end cap having an inlet portion or outlet portion, and a connection element that preferably comprises a spin-weld connection, which compliments a first half shell for connection thereto.

Figure 4:
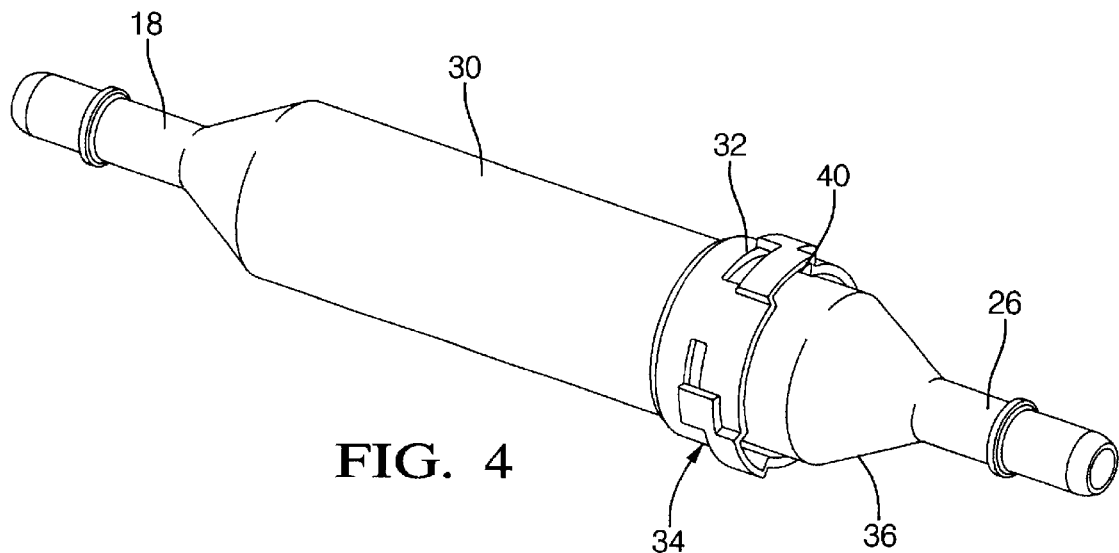
FIG. 4 illustrates yet another embodiment of the evaporative emission treatment device of FIG. 1 assembled using a twist-lock connection.

Each connection comprises a first connection element (e.g., twist-lock, snap-fit, and the like) disposed on the first half shell, and a second connection element (e.g., twist-lock, snap-fit, and the like) disposed on the second half shell, wherein the first and second connection elements are mateable (See FIG. 4). A sealing agent can be disposed within the shell to provide support to the monolith and seal the housing to prevent leakage. Preferably, this seal, which can comprise any of the above sealing agents, comprises polymeric materials, elastomeric materials, foam, plastic, composite materials, and combinations comprising at least one of the foregoing sealing agents, with elastomeric materials preferred, and an elastomeric o-ring especially preferred. An o-ring can be concentrically disposed within either the first half shell or second half shell, or within both half shells at their connection point, and between either or both half shells and the monolith (See FIG. 6). For example, a first twist-lock connection element and the second twist-lock connection element can preferably engage each other, and be secured together by a twisting motion in either a clockwise or counter-clockwise direction. The twisting motion can preferably sealingly secure the first half shell and second half shell together, and retain the o-ring in place, e.g., concentrically disposed between the monolith/sealing agent subassembly and either or both half shells.

Both the first half shell and second half shell can further comprise additional structural features designed to further support the monolith, enhance fluid flow, enable attachment to other evaporative emission system components, and enable mounting to a vehicle. In one embodiment of the shell design, to further support the monolith, a plurality of ribs, dimples, protrusions, or the like, can be disposed within the interior of either or both the first half shell and second half shell (See FIG. 8) The ribs can preferably be disposed at or near the inlet portion of the first half shell and/or, optionally, the outlet portion of the second half shell. As the monolith, or monolith/sealing agent subassembly is concentrically disposed with the half shell, the monolith can contact the plurality of ribs and rest upon the ribs, thus receiving support.

Figure 7:
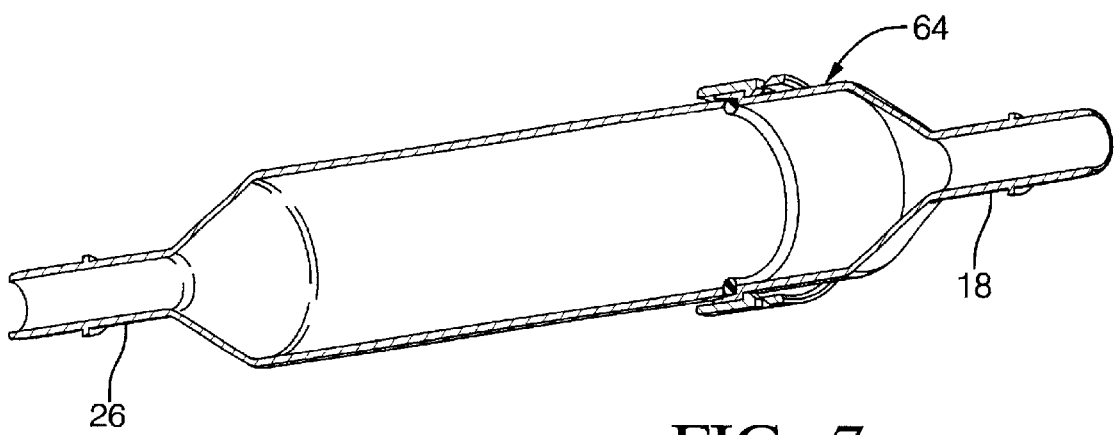
FIG. 7 is a partial cross-sectional view of an embodiment of a shell comprising a first half shell, a second half shell, and a pair of diffusers disposed at either end of the shell.

In another embodiment of the shell design, a diffuser element can be concentrically disposed about the inlet portion of the first half shell and/or the outlet portion of the second half shell (See FIG. 7). The diffuser element distributes the flow of vapors across the face of the monolith. The diffuser provides lower flow restriction and improves flow distribution across the monolith as the flow translates through the device. The diffuser element can be sized and dimensioned according to the particular application, with its size, geometry, and desired flow distribution properties ultimately dependant upon the customer's requirements and particular application.

Figure 9:
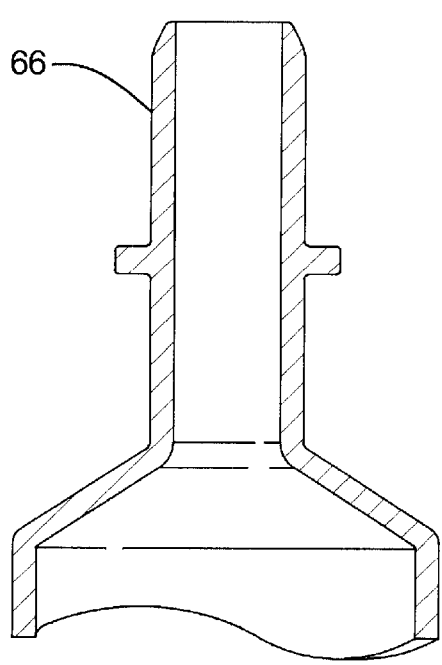
FIG. 9 illustrates an embodiment of an attachment member disposed at either or both the inlet portion and outlet portion of an embodiment of a shell.
Figure 10:
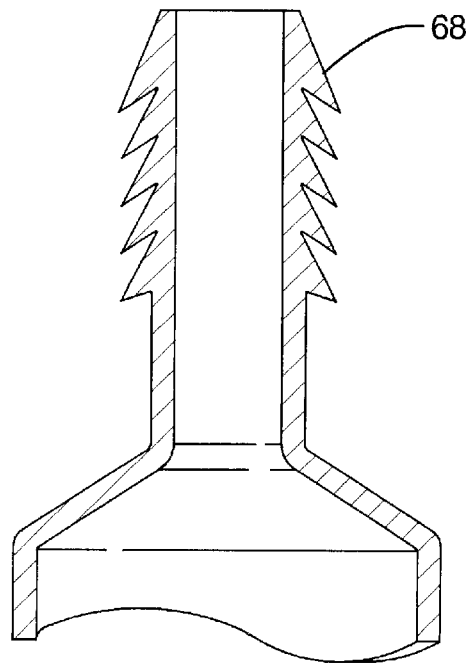
FIG. 10 illustrates an embodiment of an attachment member disposed at either or both the inlet portion and outlet portion of an embodiment of a shell.

In yet another embodiment of the shell design, both the first half shell and second half shell can further comprise an attachment element to attach the device to an evaporative emissions system component, or other system component in the vehicle. Possible attachment elements can include a quick-connect (FIG. 9), fir-tree (FIG. 10), other conventional attachment elements, and methods including, but not limited to, swaging, screwing, beaded tube, clamping, crimping, bracketing, and like, and combinations comprising at least one of the foregoing attachment elements and/or methods, and the like. The attachment elements, such as the quick-connect and fir-tree designs, can be employed at the inlet and/or outlet portions of each half shell to simplify system integration, such as integration with an evaporative emission treatment system, and the like, within a vehicle.

Figure 11:
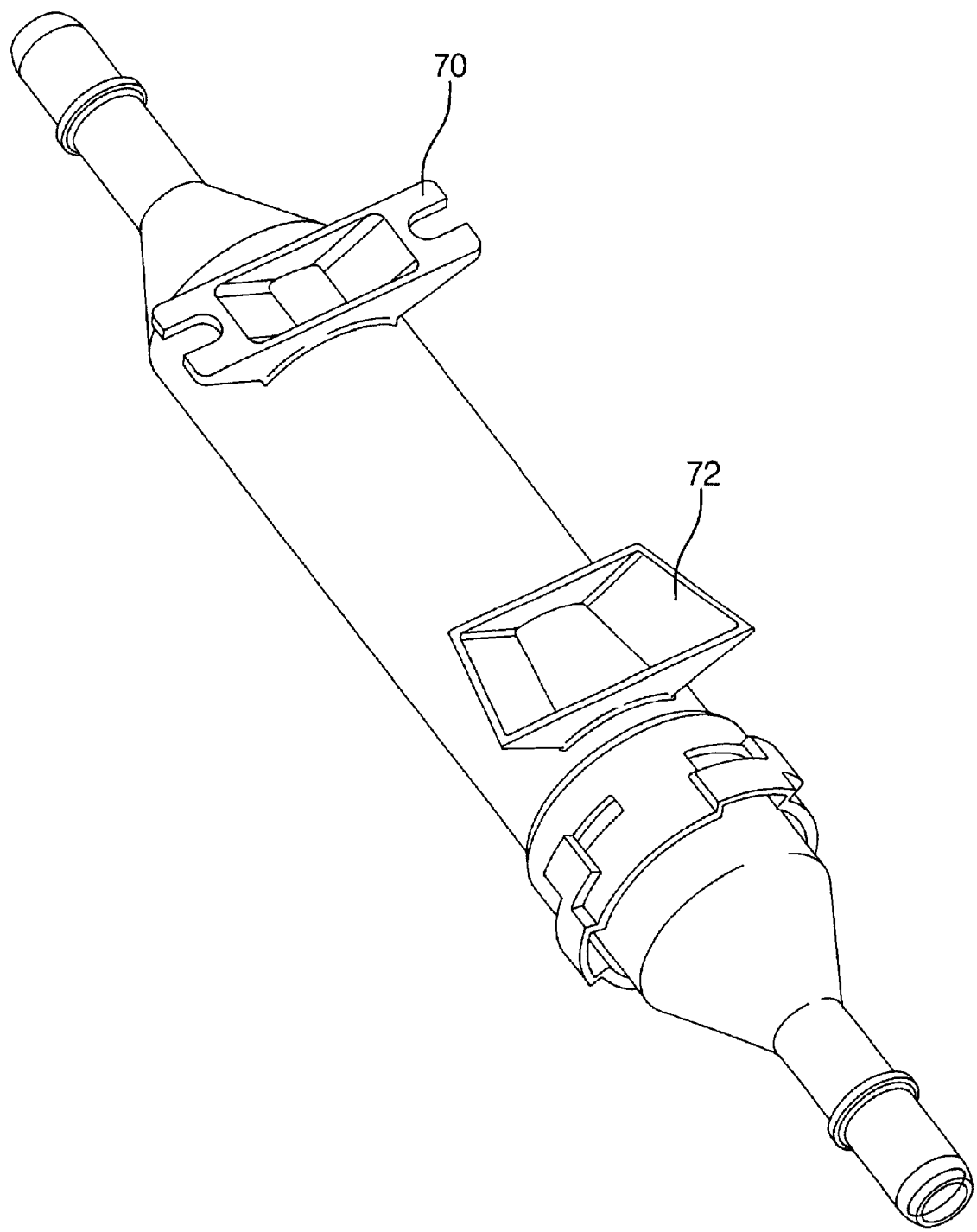
FIG. 11 illustrates the embodiment of the evaporative emission treatment device of FIG. 4 further comprising two different mounting members.

In yet another additional embodiment of the shell design, one or more mounting members can be attached to the shell to facilitate mounting the evaporative emission treatment device in any orientation to an evaporative emission treatment system, and the like, within a vehicle. Possible mounting members can include mounting tabs (See FIG. 11), dovetail mounting tabs (See FIG. 11), "belly band guides" (See FIG. 4), and combinations comprising at least one of the foregoing mounting members that can mounted by snapping, slidingly engaging, screwing, and combinations comprising at least one of the foregoing methods, in any orientation to a vehicle's system.

The additional structural features designed to further support the monolith, enhance fluid flow, enable attachment to other evaporative emission system components, and enable mounting to a vehicle, can be incorporated alone or in combination with each other. For example, a shell design comprising snap-fit connection element can also further comprise a diffuser disposed at the inlet portion of the assembly, and optionally a diffuser also disposed at the outlet portion of the assembly. That same embodiment can also further comprise a plurality of ribs disposed within either the first half shell or second half shell, or both to provide additional support to the monolith. Likewise, the inlet portion can further comprise quick-connect attachment element while the outlet portion comprises a fir-tree attachment element or a quick-connect attachment element. Ultimately, the assembly's design will depend upon the particular application and customer packaging requirements, and can vary accordingly depending upon those particular requirements.

Figure 2:
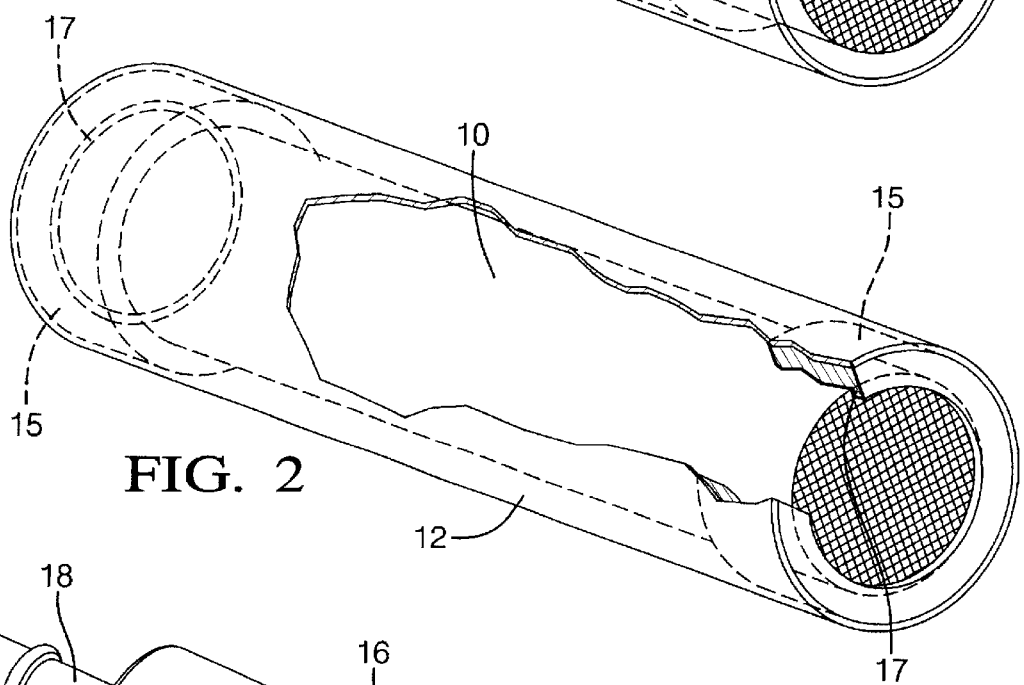
FIG. 2 is an isometric, partial cut-away view of an embodiment of the evaporative emission treatment device including an alternative embodiment of a sealing agent.

To illustrate the methods for manufacturing the evaporate emission treatment device, and treating hydrocarbon vapors from an evaporative emission system, reference will now be made to FIGS. 1–11. FIG. 1 illustrates an embodiment of a hydrocarbon scrubber comprising a monolith 10 disposed in a conventional shell 12. A plurality of sealing agents 14 are concentrically disposed around the monolith, and in between the monolith 10 and shell 12. The sealing agents 14 ensure that fuel vapors will not bypass the monolith and flow between the shell and monolith. This ensures that the fuel vapors are adsorbed and not emitted into the atmosphere. The sealing agent 14 also cushions and protects the monolith 10 from breaking during operation of the vehicle, such as when experiencing vibrations. Likewise, as illustrated in FIG. 2, the annular seals 15 are concentrically disposed about both the inlet and outlet of the monolith 10 such that a shoulder 17 of each seal 15 engages the inlet and outlet of the monolith 10. The annular seals 15 also cushion and protect the monolith 10 as do the sealing agents 14.

Figure 3:
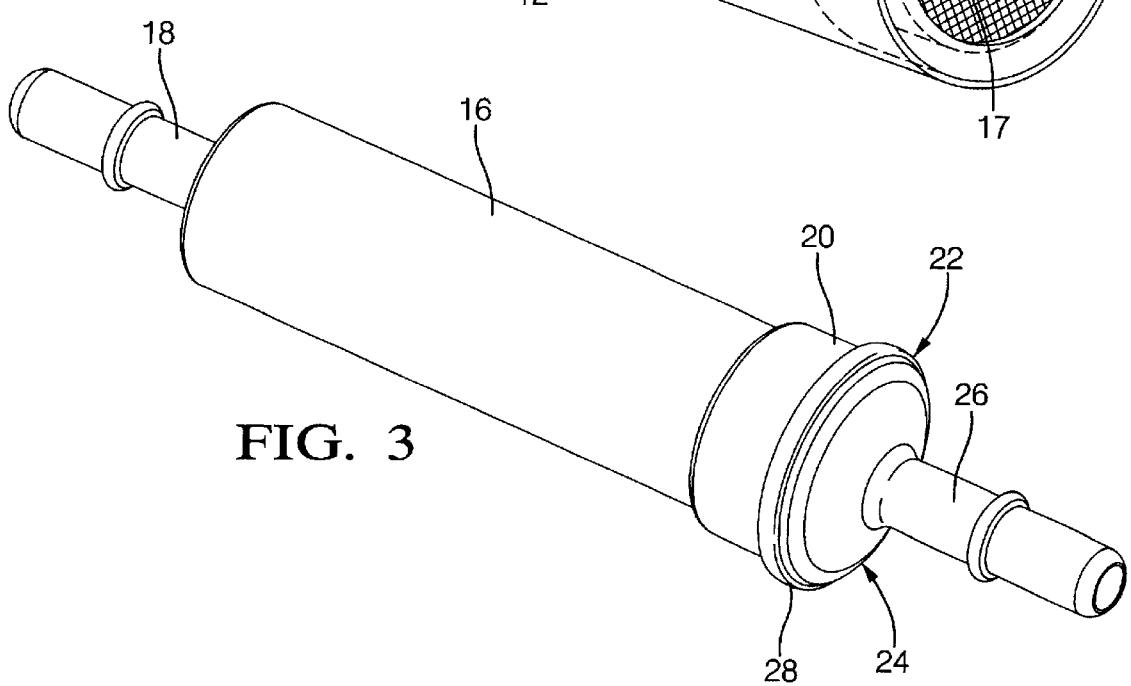
FIG. 3 illustrates an additional embodiment of the evaporative emission treatment device of FIG. 1 assembled using a spin-weld connection.
Figure 8:
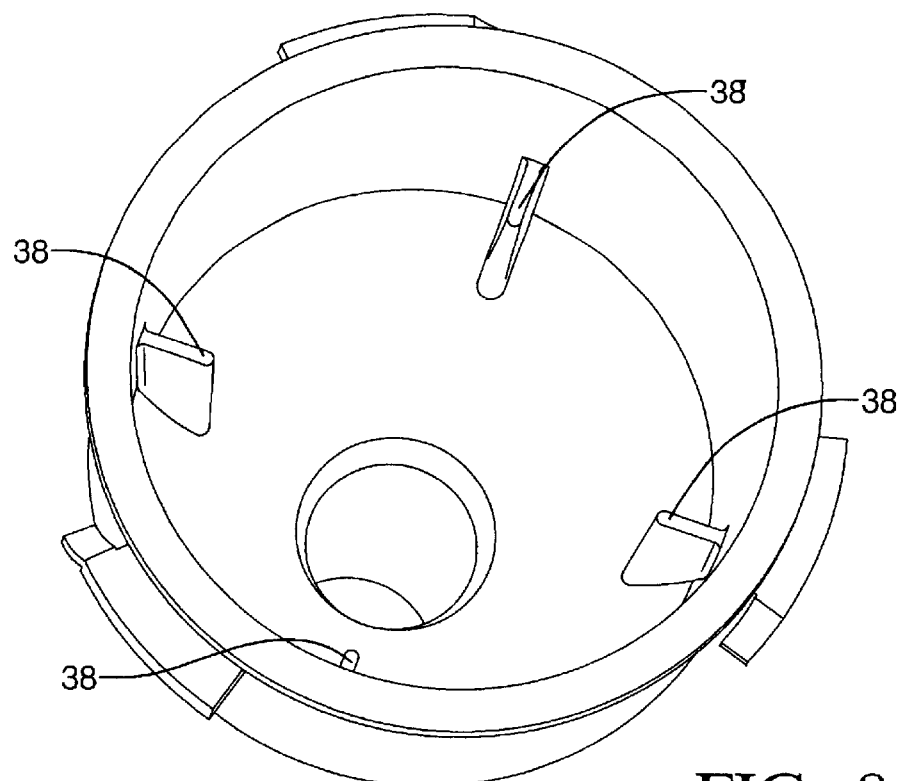
FIG. 8 is a partial cross-sectional view of an embodiment of a half shell comprising a plurality of ribs disposed within the inlet portion of the half shell.

The monolith/sealing agent subassembly can be concentrically disposed within an embodiment of a shell. Referring now to FIGS. 3 and 8, the monolith/sealing agent subassembly can be concentrically disposed within a first half shell 16 having an inlet portion 18 and a connection element 20. In addition, a plurality of ribs 38 can be disposed within the interior of either, or both, the first half shell 16 and second half shell, and/or at the outlet of the first shell half 16, i.e., disposed adjacent to endcap 24. The ribs can preferably be disposed at or near the inlet portion of the first half shell, or, optionally, the outlet portion of the second half shell, and can provide additional support to the monolith during operation of the vehicle. The first half shell 16 can be secured using a spin-weld connection 22 to an end cap 24 having an outlet portion 26 and a connection element 28.

Figure 6:
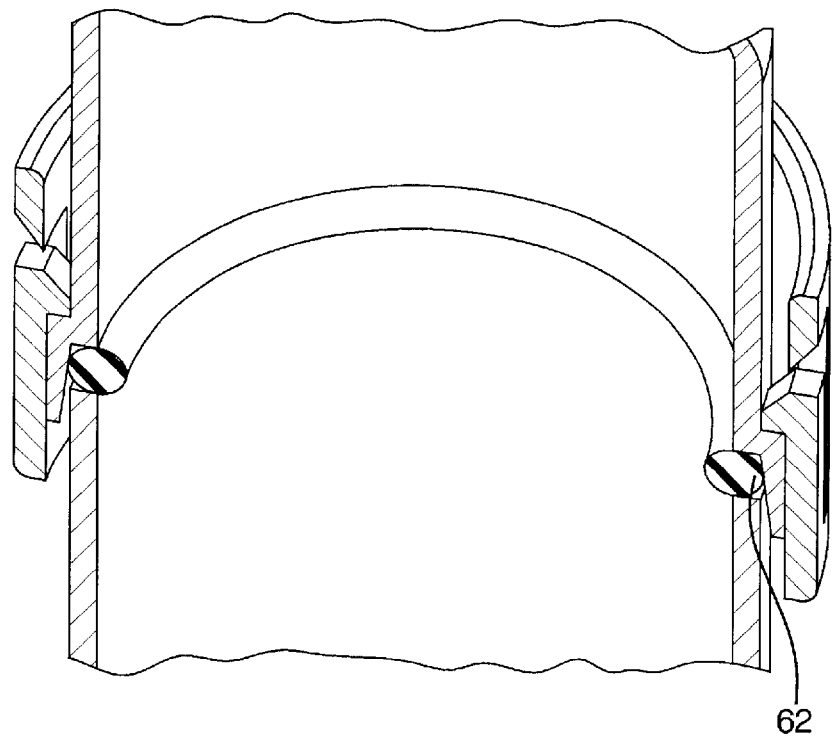
FIG. 6 is a partial cross-sectional view of the first and second half shells of the evaporative emission treatment device of FIG. 4 illustrating a sealing agent disposed within the first and second half shells.

In another embodiment, and referring now to FIGS. 4 and 6, the monolith/sealing agent subassembly can be concentrically disposed within a first half shell 30 having an inlet portion 18 and a connection element 32. The first half shell 30 can be secured using a twist-lock connection 34, and an o-ring 62 concentrically disposed within the first half shell 30 and between the shell 30 and the monolith (not shown), to a second half shell 36 having an outlet portion 26 and a connection element 40.

Figure 5:
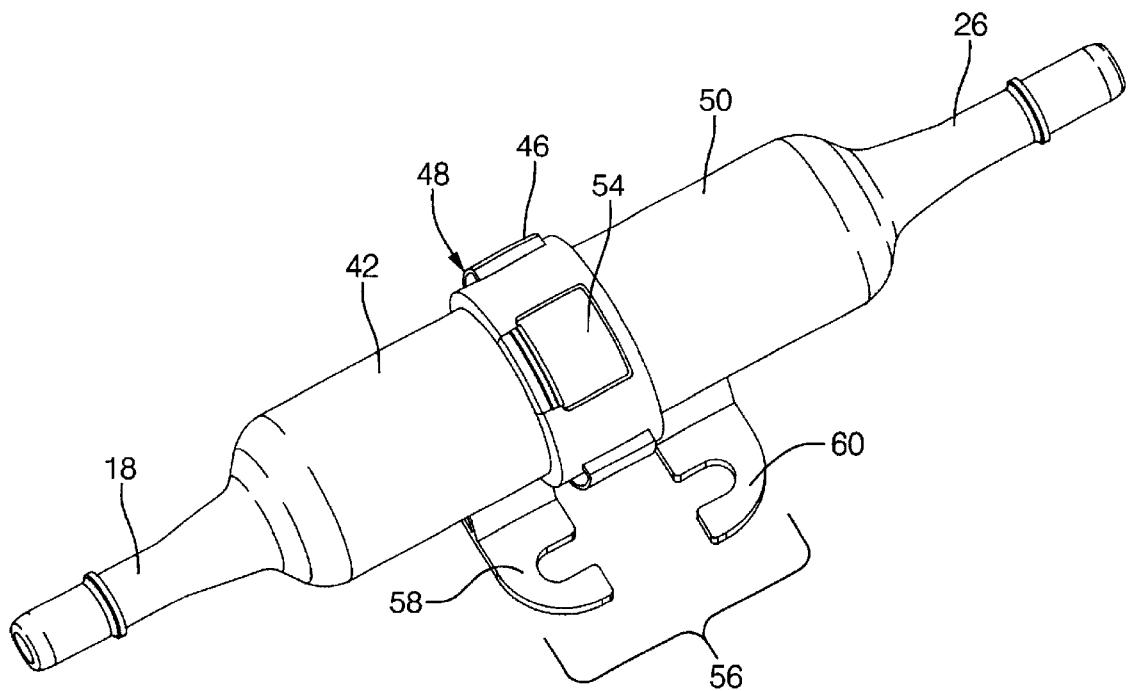
FIG. 5 illustrates another embodiment of the evaporative emission treatment device of FIG. 1 assembled using a snap-fit design.

In yet another embodiment, and referring now to FIGS. 5–6, the monolith/sealing agent subassembly can be concentrically disposed within a first half shell 42 having an inlet portion 18 and a connection element 46. The first half shell 42 can be secured using a snap-fit connection 48, and an o-ring 62 concentrically disposed within the first half shell 42 and between the shell 42 and the monolith (not shown), to a second half shell 50 having an outlet portion 26 and a connection element 54. The assembly can be mounted to a vehicle using a mounting member 56 comprising a first mounting element 58 of the first half shell 42 and a second mounting element 60 of the second half shell 50.

Each embodiment illustrated in FIGS. 3–5 can include a diffuser element 64 concentrically disposed about the inlet portion 18 of the assembly. Optionally, the diffuser element 64 can also be concentrically disposed about the outlet portion 26 of the assembly as well. In addition, each embodiment can be attached to other vehicle components using an attachment element, such as a quick-connect attachment 66 (FIG. 10), a fir-tree attachment 68 (See FIG. 9), and the like, affixed to either or both the inlet portion 18 and outlet portion 26. Basically, the assembly can be employed in the engine, the air intake, and/or coupled with a base canister for evaporative emissions from the fuel tank, and the like.

Each embodiment can also be mounted to a vehicle using a mounting member such as mounting member 56 illustrated in FIG. 4. Other possible mounting members include a mounting tab element 70 and a dovetail mounting element 72, which are both illustrated in FIG. 11. These mounting members can also be incorporated into the assembly designs illustrated in FIGS. 3 and 5, as well as other assembly designs incorporating additional structural features. Ultimately, the assembly's design will depend upon the particular application and customer packaging requirements, and can vary accordingly depending upon those particular requirements.

The evaporative emission treatment device, illustrated in FIGS. 1–11, possess several advantages over conventional evaporative emission treatment devices. The use of the flexible seal protects the carbon monolith from vibrations and other motions imparted by the vehicle to the assembly during operation. FIGS. 1–11 illustrate assembly designs that can protect the carbon monolith, as well as meet specific customer packaging requirements.

The hydrocarbon scrubber performance is based upon structural features that prevent fluid leakage, enhance fluid flow, enable attachment to other evaporative emission system components, enable mounting to a vehicle, and internally seal the monolith and sealing agents. These design features provide the necessary protection, performance enhancements, and functionality necessary to ensure optimal hydrocarbon scrubber performance.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An evaporative emission treatment device, comprising:
   a monolith suitable for adsorbing hydrocarbon evaporative emissions;
   a shell concentrically disposed about said monolith; and
   a first sealing agent concentrically disposed about said monolith, between said shell and said monolith, wherein said first sealing agent has a shoulder engaging a face of an end of the monolith.

2. The evaporative emission treatment device of claim 1, wherein said substrate further comprises a carbon monolith.

3. The evaporative emission treatment device of claim 1, wherein said shell further comprises a first shell portion and a second shell portion.

4. The evaporative emission treatment device of claim 3, wherein at least one of said first shell portion and said second shell portion further comprises a plurality of ribs, dimples or protrusions disposed.

5. The evaporative emission treatment device of claim 3, wherein said second shell portion comprises an end cap.

6. The evaporative emission treatment device of claim 5, wherein said first shell portion and said second shell portion each further comprise a connection selected from the group consisting of a snap-fit connection, a twist-lock connection, and a spin-weld connection.

7. The evaporative emission treatment device of claim 5, wherein at least one of said first shell portion and said second shell portion further comprise an attachment element selected from the group consisting of a quick-connect attachment and a fir-tree attachment.

8. The evaporative emission treatment device of claim 1, wherein said shell further comprises a mounting member selected from the group consisting of a belly band guide, dovetail mounting element, a mounting tab, and combinations comprising at least one of the foregoing mounting members.

9. The evaporative emission treatment device of claim 1, wherein said first sealing agent further comprises a sponge rubber sealing material selected from the group consisting of nitrile sponge, fluorocarbon rubber sponge, epichlorohydrin rubber sponge, and combinations comprising at least one of the foregoing sponge rubber sealing materials.

10. The evaporative emission treatment device of claim 1, wherein said first sealing agent further comprises a plurality of sleeves concentrically disposed about said monolith.

11. The evaporative emission treatment device of claim 10, wherein said first sealing agent sleeves are disposed at locations selected from the group consisting of an inlet portion of said monolith, an outlet portion of said monolith, between said inlet portion and said outlet portion of said monolith, and combinations comprising at least two of the foregoing locations.

12. The evaporate emission treatment device of claim 1, further comprising a second sealing agent concentrically disposed about said monolith, between said shell and said monolith, and adjacent to a connection joint between a first shell portion and a second shell portion.

13. The evaporate emission treatment device of claim 12, wherein said second sealing agent selected from the group consisting of polymeric materials, elastomeric materials, foam, plastic, composite materials, and combinations comprising at least one of the foregoing second sealing agents.

14. The evaporative emission treatment device of claim 12, wherein said second sealing agent further comprises an o-ring.

15. An evaporative emission treatment device, comprising:
    a monolith suitable for adsorbing hydrocarbon evaporative emissions;
    a shell concentrically disposed about said monolith, said shell having a first shell portion mated to a second shell portion; and
    a plurality of sealing agents concentrically disposed about said monolith, between said shell and said monolith, wherein at least a first sealing agent is disposed adjacent to a connection joint formed between said first shell portion and said second shell portion, and an annular seal having a shoulder engaging a face of an end of the monolith.

16. The evaporate emission treatment device of claim 15, wherein said first sealing agent is selected from the group consisting of polymeric materials, elastomeric materials, foam, plastic, composite materials, and combinations comprising at least one of the foregoing second sealing agents.

17. The evaporative emission treatment device of claim 15, wherein said first sealing agent is an o-ring.

18. The evaporative emission treatment device of claim 15, further comprising a second sealing agent disposed near an inlet portion of said monolith and a third sealing agent disposed near an outlet portion of said monolith.

19. The evaporative emission treatment device of claim 18, wherein said second sealing agent and said third sealing agent individually further comprise a sponge rubber sealing material selected from the group consisting of nitrile sponge, fluorocarbon rubber sponge, epichlorohydrin rubber sponge, and combinations comprising at least one of the foregoing sponge rubber sealing materials.

20. A method for manufacturing an evaporative emission treatment device, comprising:
    disposing a sealing agent comprising an annular seal about a monolith to form a monolith/sealing agent subassembly, wherein said monolith is suitable for adsorbing hydrocarbon evaporative emissions;
    said annular seal having a shoulder engaging a face of an end of the monolith;
    disposing said monolith/sealing agent subassembly in a first shell portion;
    connecting said first shell portion to a second shell portion; and
    securing said first shell portion and said second shell portion.

21. The method of claim 20, further comprising disposing a plurality of sleeves of said sealing agent about said monolith.

22. The method of claim 21, wherein said plurality of sleeves are disposed at locations selected from the group consisting of an inlet portion of said monolith, an outlet portion of said monolith, between said inlet portion and said outlet portion of said monolith, and combinations comprising at least two of the foregoing locations.

23. The method of claim 20, further comprising contacting said monolith/sealing agent subassembly with a plurality of ribs, dimples or protrusions disposed within said first shell portion.

24. The method of claim 20, wherein said connecting further comprises connecting said first shell portion and said second shell portion using a connection element selected from the group consisting of a snap-fit connection, a twist-lock connection, a spin-weld connection, and combinations comprising at least one of the foregoing connection elements.

25. The method of claim 20, further comprising disposing a second sealing agent within said first shell portion, wherein said second sealing agent further comprises an o-ring.

* * * * *